(12) United States Patent
Bezbaruah et al.

(10) Patent No.: US 12,259,790 B2
(45) Date of Patent: Mar. 25, 2025

(54) HIGH FREQUENCY SNAPSHOT TECHNIQUE FOR IMPROVING DATA REPLICATION IN DISASTER RECOVERY ENVIRONMENT

(71) Applicant: Nutanix, Inc., San Jose, CA (US)

(72) Inventors: Angshuman Bezbaruah, Redmond, WA (US); Kiran Tatiparthi, Dublin, CA (US); Mahesh Venkataramaiah, San Jose, CA (US); Pranay Kumar Ega, Gilroy, CA (US); Praveen Kumar Padia, Fremont, CA (US); Ramya Bolla, San Jose, CA (US); Sudhir Ravi, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/388,735

(22) Filed: Jul. 29, 2021

(65) Prior Publication Data
US 2022/0398163 A1    Dec. 15, 2022

Related U.S. Application Data

(60) Provisional application No. 63/210,274, filed on Jun. 14, 2021.

(51) Int. Cl.
*G06F 16/27*    (2019.01)
*G06F 7/14*    (2006.01)
(Continued)

(52) U.S. Cl.
CPC ............ *G06F 11/1451* (2013.01); *G06F 7/14* (2013.01); *G06F 16/215* (2019.01);
(Continued)

(58) Field of Classification Search
CPC .......... G06F 11/14; G06F 7/14; G06F 16/215; G06F 16/27; G06F 2201/82; G06F 2201/84
See application file for complete search history.

(56) References Cited

U.S. PATENT DOCUMENTS 7,809,691 B1 * 10/2010 Karmarkar .......... G06F 11/1464
    707/681
8,463,753 B2 * 6/2013 Gokhale ............... G06F 3/0652
    707/663
(Continued)

OTHER PUBLICATIONS

Cano, Ignacio, "Curator: Self-Managing Storage for Enterprise Clusters" University of Washington; published Mar. 2017; pp. all.
(Continued)

*Primary Examiner* — Maher N Algibhah
(74) *Attorney, Agent, or Firm* — Cesari and McKenna, LLP

(57) ABSTRACT

A high frequency snapshot technique improves data replication in a disaster recovery (DR) environment. A base snapshot is generated from failover data at a primary site and replicated to a placeholder file at a secondary site. Upon commencement of the base snapshot generation and replication, incremental light weight snapshots (LWSs) of the failover data are captured and replicated to the secondary site. A staging file at the secondary site accumulates the replicated LWSs ("high-frequency snapshots"). The staging file is populated with the LWSs in parallel with the replication of the base snapshot at the placeholder file. At a subsequent predetermined time interval, the accumulated LWSs are synthesized to capture a "checkpoint" snapshot by applying and pruning the accumulated LWSs at the staging file. Once the base snapshot is fully replicated, the pruned LWSs are merged to the base snapshot to synchronize the replicated failover data.

19 Claims, 6 Drawing Sheets

(51) Int. Cl.
*G06F 11/14* (2006.01)
*G06F 16/215* (2019.01)

(52) U.S. Cl.
CPC ........ *G06F 16/275* (2019.01); *G06F 2201/82* (2013.01); *G06F 2201/84* (2013.01)

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron et al. |
| 8,943,281 B1* | 1/2015 | Stringham .......... G06F 11/1458 |
| | | 711/162 |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 10,664,356 B1* | 5/2020 | Ugur-Ozekinci ... G06F 11/1464 |
| 11,436,097 B1 | 9/2022 | Kumar et al. |
| 11,575,745 B2 | 2/2023 | Tatiparthi et al. |
| 2012/0036106 A1* | 2/2012 | Desai ...................... G06F 16/27 |
| | | 707/645 |
| 2016/0298553 A1* | 10/2016 | Ängeby .............. F02D 41/0002 |
| 2017/0353550 A1* | 12/2017 | Mutalik ............... G06F 11/2097 |
| 2019/0018593 A1* | 1/2019 | Hutchison ............. G06F 3/0608 |
| 2021/0093915 A1* | 4/2021 | Knight ................. A61B 5/7405 |
| 2021/0288820 A1* | 9/2021 | Barbe ................... H04L 9/3215 |
| 2021/0294774 A1* | 9/2021 | Keller ................... G06F 16/125 |
| 2022/0309010 A1 | 9/2022 | Jiang et al. |
| 2022/0374316 A1 | 11/2022 | Kumar et al. |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

* cited by examiner

HIGH FREQUENCY SNAPSHOT TECHNIQUE FOR IMPROVING DATA REPLICATION IN DISASTER RECOVERY ENVIRONMENT

CROSS-REFERENCE TO RELATED APPLICATION

The present application claims the benefit of U.S. Provisional Patent Application Ser. No. 63/210,274, which was filed on Jun. 14, 2021, by Angshuman Bezbaruah et al. for HIGH FREQUENCY SNAPSHOT TECHNIQUE FOR IMPROVING DATA REPLICATION IN DISASTER RECOVERY ENVIRONMENT, which is hereby incorporated by reference.

BACKGROUND

Technical Field

The present disclosure relates to data failover and, more specifically, to data failover using data replication and snapshots in a disaster recovery environment.

Background Information

Data failover generally involves copying or replicating data among multiple datacenters typically using a reference snapshot with subsequent updates to enable continued operation of data processing operations in a data replication environment, such as backup, content distribution and/or disaster recovery. As used herein, the data replication environment includes two or more datacenters, i.e., sites, which are often geographically separated by relatively large distances and connected over a communication network, e.g., a wide area network. For example, data at a local datacenter (primary site) may be replicated over the network to one or more remote datacenters (secondary site) located at geographically separated distances to ensure continued data processing operations in the event of a failure of the primary site. However, disaster recovery for large sized datasets involves transfer of a large sized reference snapshot among sites that usually consumes a significant amount of time, during which updates may be accumulated that later need to be transferred. This may consume yet more time during which yet more updates are accumulated. As a result, a lengthy iterative transfer of snapshots and updates is usually required for convergence in order to support disaster recovery of large datasets with reasonable recovery point objectives.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a high frequency snapshot technique configured to reduce duration of data replication and improve recovery point objectives (RPO) in a disaster recovery (DR) environment. A data object (e.g., a virtual disk) at a primary site is designated for failover to a secondary site in the event of failure of the primary site. Illustratively, a base snapshot is generated from the data designated for failover (i.e., failover data) at a primary node of the primary site and replicated to a placeholder file allocated at a secondary node of the secondary site in the DR environment. Upon commencement of the base snapshot generation and replication, the primary node begins capturing and replicating subsequent data (i.e., after a time of the base snapshot) as incremental light weight snapshots (LWSs) of the failover data (e.g., accumulated changes as differential and/or incremental data to the base snapshot) to the secondary node of the secondary site at a "high frequency", e.g., less than 60 seconds. A temporary staging file is provided at the secondary site to continually apply the replicated LWSs ("high-frequency snapshots") as incremental changes to synthesize snapshots of those changes at the secondary site prior to completion of the base snapshot replication. In such a manner, the base snapshot and the synthesized snapshots capturing changes during the transfer of the base snapshot become available at the secondary site at substantially a same time once replication of the base snapshot completes because the incremental changes and the base snapshot are transferred concurrently. Notably, the staging file is populated with the LWSs in parallel with the replication of the base snapshot at the placeholder file. At a subsequent predetermined time interval (e.g., hourly interval), the accumulated LWSs may be combined (synthesized) to capture a "checkpoint" snapshot by applying (processing) the accumulated LWSs at the staging file to, e.g., "prune" or eliminate any overwrites or stale data associated with the accumulated LWSs within the file. Once the base snapshot is fully replicated (completes), the pruned LWSs (deltas) are applied to the base snapshot to synchronize the replicated failover data so that the base snapshot is up to date with a latest LWS. As a result, replication of changes or deltas to the base snapshot (as represented by the LWSs) is not delayed until after the base snapshot is fully replicated, but rather the deltas are available at substantially a same time as completion of the replication for the base snapshot, thereby reducing convergence time and improve RPO in a disaster recovery (DR) environment.

DESCRIPTION

Figure 1:
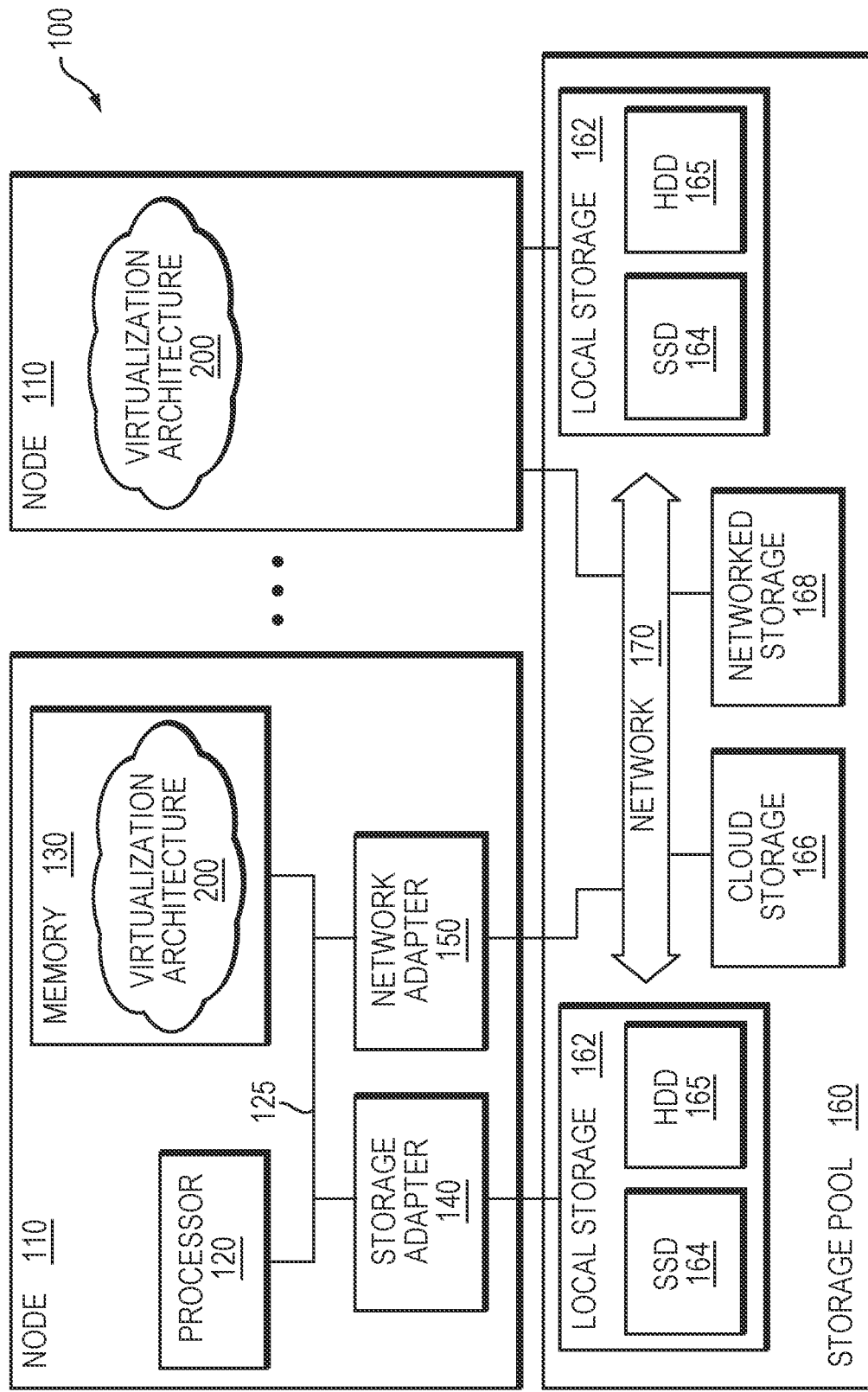
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
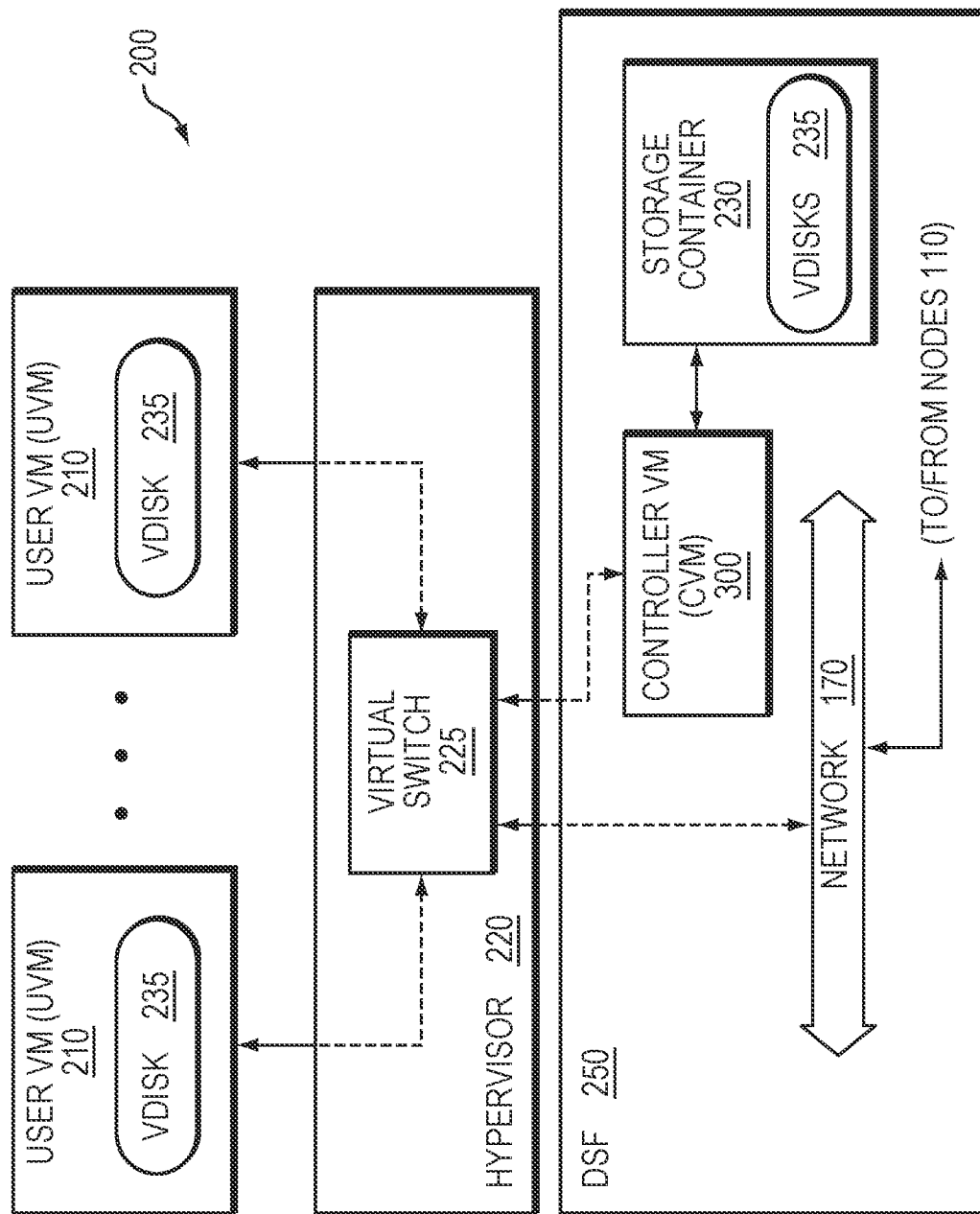
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI. CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI. CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
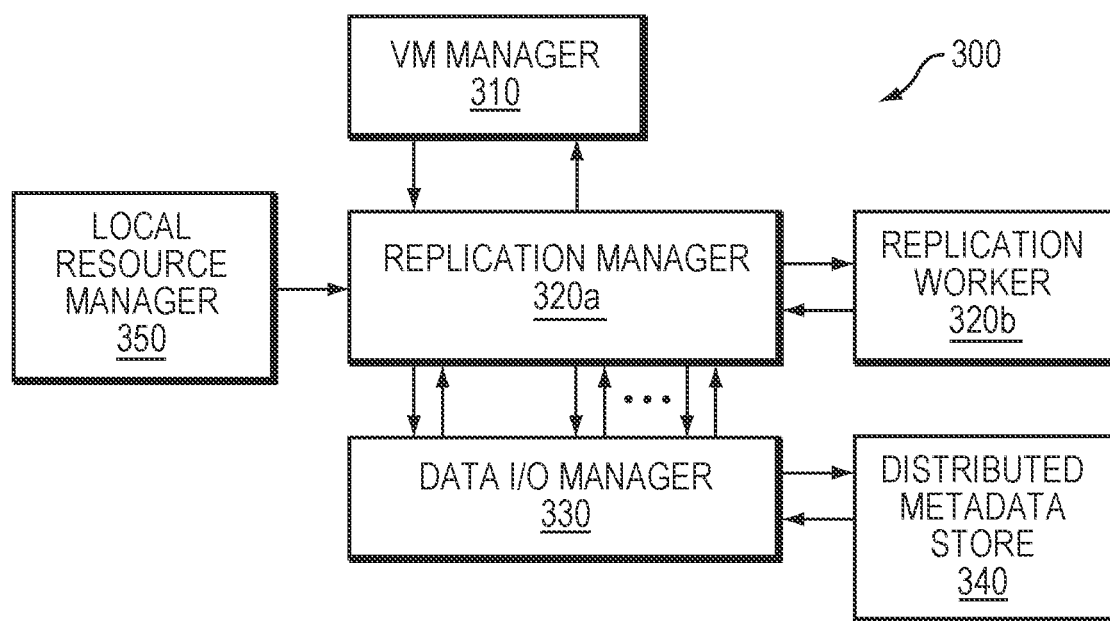
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 30) runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A local resource manager 350 allows users (administrators) to monitor and manage resources of the cluster. A replication manager 320a is configured to provide replication and disaster recovery services of DSF 250 and, to that end, cooperates with the local resource manager 350 to implement the services, such as migration/failover of virtual machines and containers, as well as scheduling of snapshots. In an embodiment, the replication manager 320a may also interact with one or more replication workers 320b. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Data failover generally involves copying or replicating data among one or more nodes 110 of clusters 100 embodied as, e.g., datacenters to enable continued operation of data processing operations in a data replication environment, such as disaster recovery. The data replication environment includes two or more datacenters, i.e., sites, which are typically geographically separated by relatively large distances and connected over a communication network, such as a WAN. For example, data at a local datacenter (e.g., primary site) may be replicated over the network to one or more remote datacenters (e.g., secondary site) located at geographically separated distances to ensure continuity of data processing operations in the event of a failure of the nodes at the primary site.

Synchronous replication may be used to replicate the data between the sites such that each update to the data at the primary site is copied to the secondary site. For instance, every update (e.g., write operation) issued by a UVM 210 to data designated for failover (i.e., failover data) is continuously replicated from the primary site to the secondary site before the write operation is acknowledged to the UVM. Thus, if the primary site fails, the secondary site has an exact (i.e., mirror copy) of the failover data at all times. Synchronous replication generally does not require the use of snapshots of the data; however, to establish a data replication environment or to facilitate recovery from, e.g., network outages in such an environment, a snapshot may be employed to establish a point-in-time reference from which the site can (re)synchronize the failover data.

In the absence of continuous synchronous replication between the sites, the current state of the failover data at the secondary site always "lags behind" (is not synchronized with) that of the primary site resulting in possible data loss in the event of a failure of the primary site. If a specified amount of time lag in synchronization is tolerable (e.g., 60 minutes), then asynchronous (incremental) replication may be selected between the sites, for example, a point-in-time image replication from the primary site to the secondary site is not more than 60 minutes behind. Incremental replication generally involves at least two point-in-time images or snapshots of the failover data to be replicated, e.g., a base snapshot that is used as a reference and a current snapshot that is used to identify incremental changes to the data since the base snapshot. To facilitate efficient incremental replication in a data protection environment, a base snapshot is required at each site. Note that the failover data may include an entire state of a vdisk or virtual machine including associated storage objects.

Figure 4:
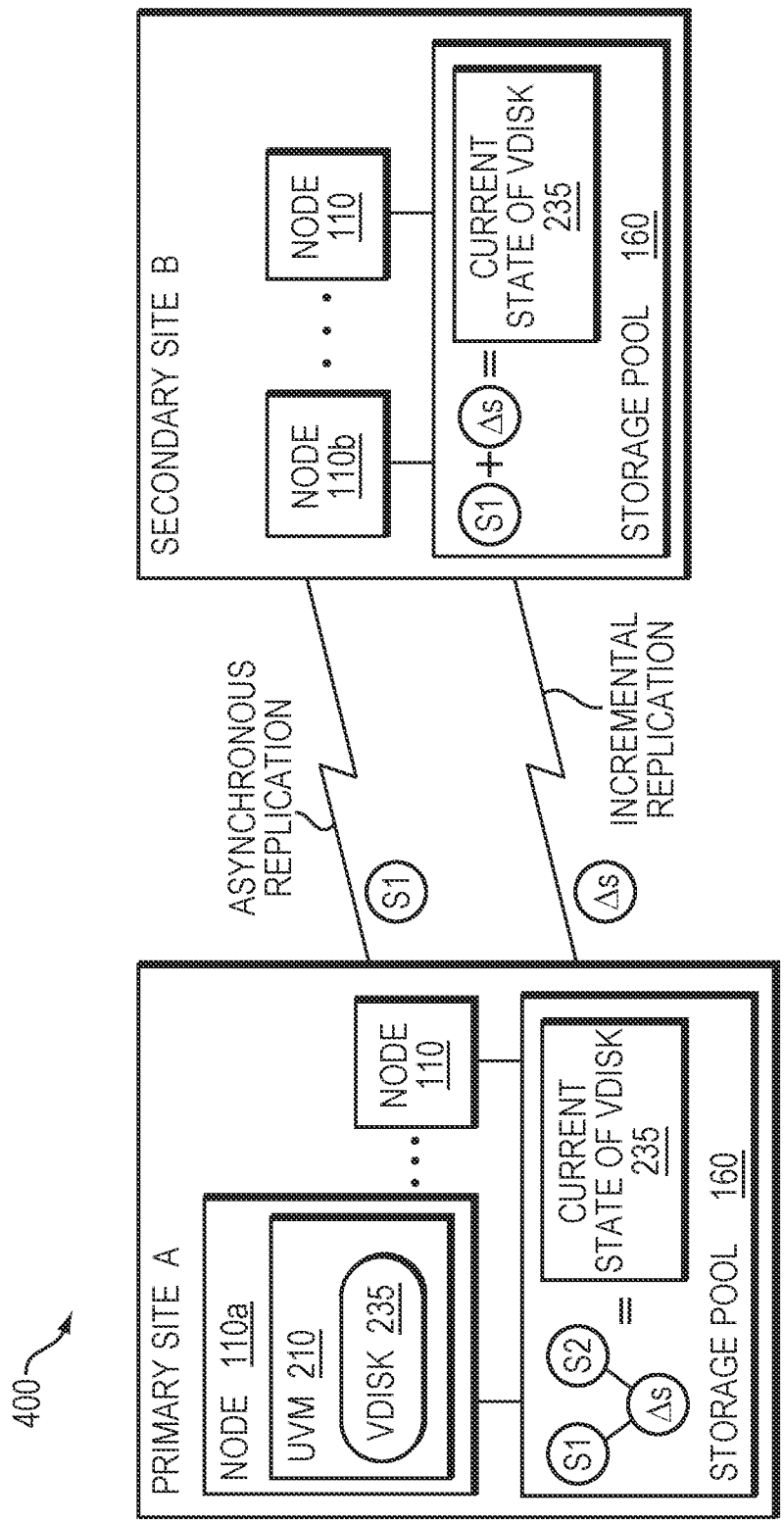
FIG. 4 is a block diagram of an exemplary data replication environment configured for use in various deployments such as disaster recovery (DR)

FIG. 4 is a block diagram of an exemplary data replication environment configured for use in various deployments, such as disaster recovery (DR). Illustratively, the environment 400 includes a primary site A and a secondary site B, wherein each site represents a datacenter embodied as a cluster 100 having one or more nodes 110. A category of data (e.g., a vdisk 235) on primary node 110a at primary site A is designated for failover to secondary site B (e.g., secondary node 110b) in the event of failure of primary site A. A first snapshot S1 of the failover data is generated at the primary site A and replicated (e.g., via a form of asynchronous snapshot replication) to secondary site B as a base or "common" snapshot S1. A period of time later, a second snapshot S2 may be generated at primary site A to reflect a current state of the failover data (e.g., vdisk 235). Since the common snapshot S1 exists at sites A and B, only incremental changes (deltas Δs) to the data designated for failover need be sent (e.g., via incremental replication) to site B, which applies the deltas (Δs) to S1 so as to synchronize the state of the vdisk 235 to the time of the snapshot S2 at the primary site.

A tolerance of how long before data loss will exceed what is acceptable determines (i.e., imposes) a frequency of snapshots and replication of deltas to failover sites, e.g., a data loss tolerance of 60 minutes requires snapshots with commensurate delta replication every 60 minutes (hourly)—deemed a Recovery Point Objective (RPO) of 60 minutes. Note that the specified amount of tolerable data loss depends on a periodicity of replication between the sites. For a periodicity of less than 15 minutes (e.g., RPO<15 mins), a form of incremental replication deemed as near synchronous (NearSync) replication may be employed that uses light weight snapshots (LWS) based on write operation logs (e.g., intent logs) prior to storing data at rest. Broadly stated, the LWS is created using a logged group of write operations (e.g., may not yet be stored at rest) that represents the current failover data of the vdisk at the primary site (organized as a file) which may be replicated to the secondary site in accordance with the specified RPO periodicity. In this manner, low RPOs may be accommodated with minimal network and computational overhead.

As noted, a base snapshot is required at each site to facilitate efficient incremental replication in a data protection environment. To that end, an administrator may configure a DR replication schedule that includes generation of a base or reference snapshot of a vdisk 235 at the source (primary) site and replication of the vdisk to the destination (secondary) site. Typically, incremental (e.g., NearSync) replication does not commence (start) until the base snapshot generation and subsequent replication has completed because the incremental snapshots are generated and applied in reference (as changes or deltas) to the base snapshot. For example, assume the base snapshot requires a relatively long time period (e.g., 20 hours) to replicate to the secondary site because of the relatively large size of the failover data (vdisk) to be protected. During the relatively long replication time period, subsequent write operations (i.e., after creation of the base snapshot) may be issued by a UVM 210 to the vdisk 235 and accumulated at the primary site. As a result, the accumulated write operations may be stored at the primary site awaiting replication to the secondary site, which requires a period of time (e.g., 6 hours) to generate and replicate during which additional writes are accumulated for a next replication to the secondary site and so on. Eventually the replicated protected data (vdisk) converges to a "recent" state (e.g., less than an hour). However, the time needed to converge (convergence time) the deltas (accumulated writes) and base snapshot may be far longer than the transfer time of the base snapshot itself as the larger the base snapshot, the longer the time for new writes to accumulate that need convergence.

Figure 5:
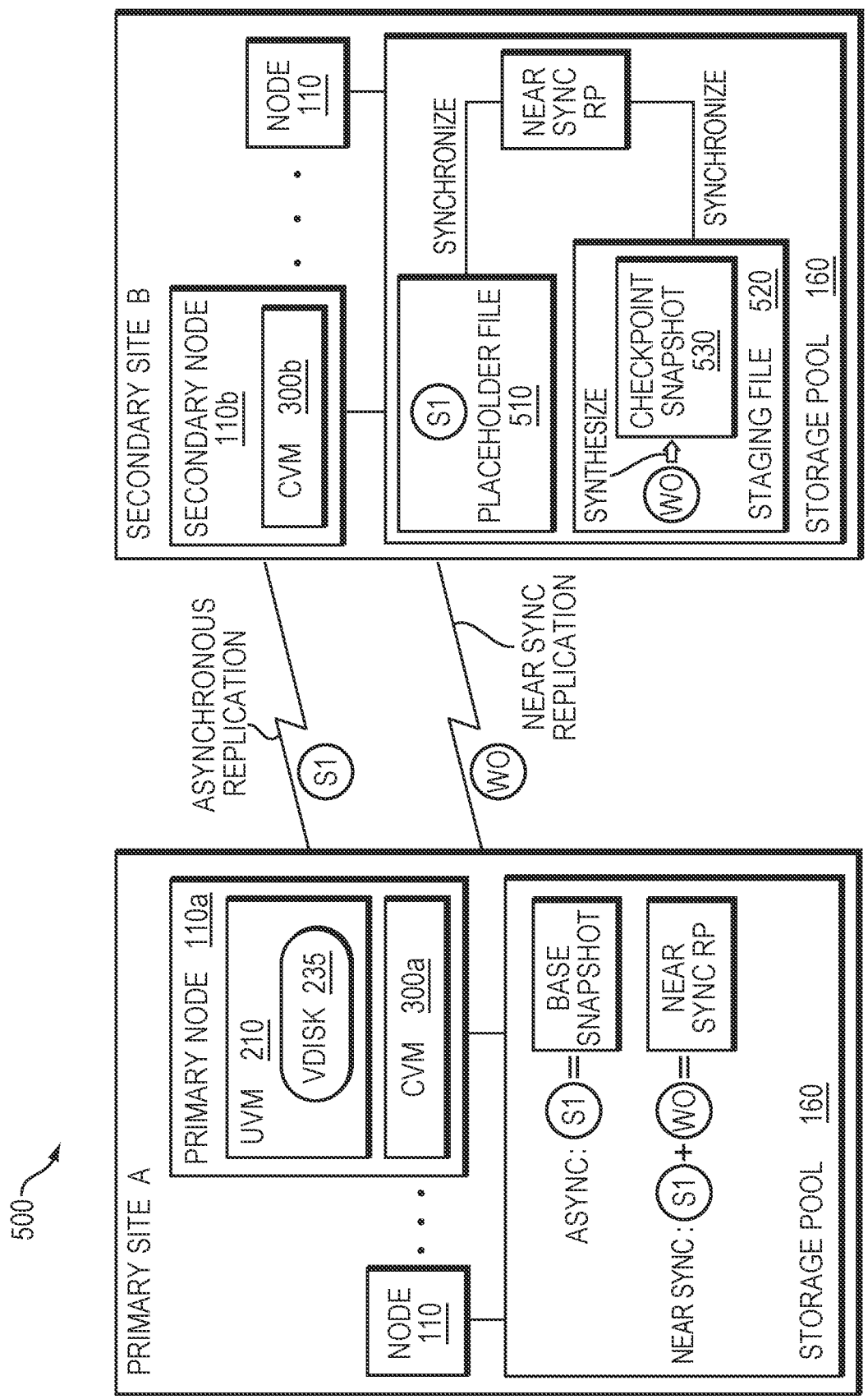
FIG. 5 is a block diagram illustrating a high frequency snapshot technique configured to improve data replication among nodes of a DR environment.

The embodiments described herein are directed to a high frequency snapshot technique configured to reduce duration data replication and improve RPO in a disaster recovery (DR) environment. FIG. 5 is a block diagram illustrating the high frequency snapshot technique 500. A data object (e.g., a vdisk 235) at primary site A is designated for failover to secondary site B in the event of failure of the primary site. CVM 300a generates a base snapshot S1 from the data (vdisk) designated for failover (i.e., failover data) at primary node 110a of primary site A and replicates S1 (e.g., via asynchronous replication) to a placeholder file 510 allocated at secondary node 110b of secondary site B in the DR environment. In an embodiment, the placeholder file 510 may be provisioned to consume the storage space, e.g., of a local disk in storage pool 160 of secondary site B needed to accommodate the failover data (e.g., vdisk 235) of S1. For example, if the size (storage space) of the vdisk being replicated is 10 TB, then a 10 TB placeholder file 510 may be allocated and provisioned at the storage pool 160 of the secondary site B.

Upon commencement of the base snapshot generation and replication, the CVM 300a of primary node 110a begins capturing and replicating (via NearSync replication) subsequent data (i.e., after a time of the base snapshot) as incremental light weight snapshots (LWSs) of the failover data (e.g., accumulated changes as differential and/or incremental data to the base snapshot) to secondary node 110b of secondary site B at a "high frequency", e.g., a short periodic time interval, such as 20 seconds. In such a manner, the base snapshot and the accumulated changes become available at the secondary site at substantially the same time once replication of the base snapshot completes. Note however that since the accumulated changes and the base snapshot are transferred concurrently, the accumulated changes may be available earlier at the secondary site than the completion of the base snapshot replication.

For NearSync replication, a group of write operations (WO) for the failover data issued, e.g., by UVM 210, at primary site A is organized as a file (hereinafter "LWS") and replicated to secondary B site, which applies the LWS write operations to common snapshot S1 to establish a "NearSync" (i.e., a low RPO below a predetermined threshold, e.g., 15 mins) recovery point (RP). A temporary staging file 520 is provided at secondary site B to accumulate these replicated "high-frequency snapshots" (LWSs). In an embodiment, the staging file 520 may be thinly provisioned to consume only the storage space, e.g., of local disks (local storage 162) in storage pool 160 of secondary site B initially needed to configure the file 520. The size (storage space) of the staging file 520 may thereafter increase as the LWSs (deltas) associated with the failover data are replicated from primary node 110a. Notably, the staging file 520 is populated with the LWSs in parallel with the replication of the base snapshot S1 stored at the placeholder file 510.

At a subsequent predetermined time interval (e.g., hourly interval), the accumulated LWSs are combined (synthesized) to capture a "checkpoint" snapshot 530 at the secondary site B. In an embodiment, the accumulated LWSs are synthesized to synthetically generate a full snapshot (i.e., checkpoint snapshot 530) that would otherwise be explicitly replicated from the primary site A by applying (processing) the accumulated LWSs at the staging file 520 to, e.g., "prune" or eliminate any overwrites or stale data associated with the accumulated LWSs within the file 520. Notably, the synthesized snapshots may be further pruned according to retention policies to support RPOs. The pruned LWSs (deltas) are applied to the staging file to synthesize snapshots continuously as changes are replicated to the secondary site while the base snapshot is being transferred (i.e., LWS are applied to the staging file concurrent with transfer of the base snapshot). Once the base snapshot is fully replicated, the stage file incorporating the synthesized snapshots is merged with the base snapshot (via linking of the staging file to the placeholder file as described herein) to synchronize the replicated failover data as a NearSync RP. As a result, replication of changes or deltas (as represented by the LWSs) to the base snapshot S1 is not delayed until after the base snapshot is fully replicated, but rather the deltas are available at substantially the same time as completion of the replication for the base snapshot, thereby reducing convergence time of the deltas and base snapshot to establish the NearSync RP at the secondary site and improve RPO in a disaster recovery (DR) environment.

In an embodiment, snapshot retention policies may be honored and enforced at the primary and secondary sites such that garbage collection can proceed as planned. For example, a retention policy that specifies a 60 minute lifetime (expiry) for hourly snapshots (such as checkpoint snapshot 530) and 15 minute expiry for high-frequency snapshots (such as LWS) may be enforced at the secondary site for the staging file 520 (e.g., after the WO deltas have been applied to the checkpoint snapshot 530) to discard those snapshots after 75 minutes (i.e., 60 minutes plus 15 minutes for the last LWS).

Notably, a key aspect of the technique involves parallel replication of the LWSs with the base snapshot S1 such that, upon completion of replication of the base snapshot to the secondary site, the (pruned) LWS deltas of the staging file 520 may be immediately applied to the base snapshot S1 of placeholder file 510 to enable NearSync capability, e.g., a NearSync RP. In an embodiment, the staging file 520 configured to temporarily store accumulated (and pruned) LWSs is linked (e.g., via metadata such as a link pointer) to the placeholder file 510 configured to store the failover data of base snapshot S1 such that, upon completion of replication, the pruned LWSs can be immediately applied to the base snapshot. Thereafter, subsequent LWS delta replication and application to the base snapshot at the secondary site may be performed to establish subsequent NearSync RPs.

Figure 6:
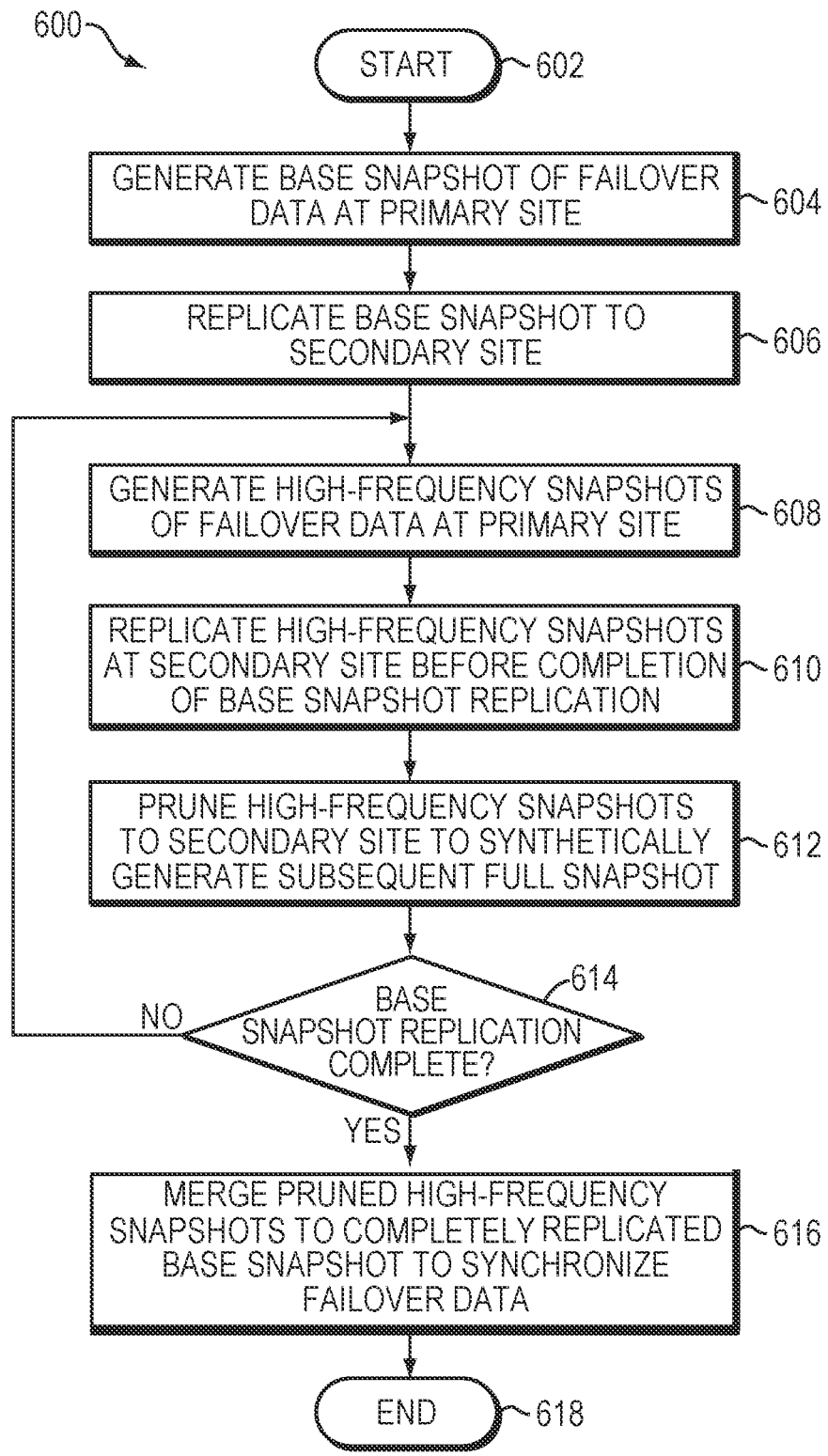
FIG. 6 is a simplified procedure for improving data replication in a DR environment in accordance with the high-frequency snapshot technique.

FIG. 6 is a simplified procedure for improving data replication in a DR environment in accordance with the high-frequency snapshot technique. The procedure 600 starts at box 602 and proceeds to box 604 where a full, base snapshot of failover data (e.g., a vdisk) is generated at a primary node of primary site A. At box 606, the base snapshot is replicated (e.g., via snapshot replication) to one or more secondary nodes of secondary site B. At box 608, high-frequency incremental (LWS) snapshots of the failover data are generated at the primary node and, at box 610, the high-frequency snapshots are replicated (e.g., via NearSync replication) to the secondary site before completion of the base snapshot replication. At box 612, the failover data (deltas) from the high-frequency snapshots are gathered and processed (pruned) to synthetically generate a subsequent full snapshot (e.g., checkpoint snapshot) while the base snapshot replication is in progress. At decision box 614, a determination is rendered as to whether the base snapshot replication has completed. If not, the procedure returns to box 608; otherwise, the pruned high-frequency snapshots are merged (via linking) to the completely replicated base snapshot to synchronize the replicated failover data at box 616. The procedure then ends at box 618.

In sum, the technique provides a NearSync capability (synchronization with the base snapshot at a relatively short predetermined time interval, e.g., less than an hour) at the secondary site in a time efficient manner. That is, periodic pruning of the replicated LWSs (changes or deltas to the base snapshot) at the secondary site in parallel with the base snapshot replication enables immediate application of the pruned LWSs to the base snapshot upon completion of the base snapshot replication so that the NearSync capability may be realized. Note that, in an alternate embodiment, pruning of the LWSs may occur at the primary site.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or compact disks) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor, the program instructions configured to:
    initiate replication of a first snapshot of a data object from a first site to a second site;
    generate high-frequency incremental snapshots of the data object at intervals of less than or equal to 60 seconds at the first site having changes to the data object occurring after creation of the first snapshot;
    replicate the incremental snapshots from the first site to a staging file at the second site in parallel with the replication of the first snapshot;
    continuously apply the replicated high-frequency incremental snapshots to the staging file at the second site;
    prune overwritten data in the replicated high-frequency incremental snapshots of the staging file at the second site to synthesize one or more full snapshots;
    prune the one or more synthesized full snapshots of the staging file according to a snapshot retention policy; and
    merge the synthesized full snapshot of the staging file with the replicated first snapshot at the second site upon completion of the replication of the first snapshot.

2. The non-transitory computer readable medium of claim 1 wherein the program instructions are further configured to synthesize a second snapshot of the data object at the second site based on the continuously applied replicated incremental snapshots.

3. The non-transitory computer readable medium of claim 2 wherein the program instructions are further configured to apply the snapshot retention policy to the second snapshot.

4. The non-transitory computer readable medium of claim 1 wherein the incremental snapshots occur at a periodic time interval.

5. The non-transitory computer readable medium of claim 1 wherein the incremental snapshots are based on write operations recorded in an operation log of the first site.

6. The non-transitory computer readable medium of claim 1, wherein the staging file is thinly provisioned.

7. A method comprising:
- initiating replication of a first snapshot of a data object from a first computing node of a first site to a second computing node of a second site;
- generating high-frequency incremental snapshots of the data object at intervals of less than or equal to 60 seconds at the first site having changes to the data object occurring after creation of the first snapshot;
- replicating the incremental snapshots from the first site to a staging file at the second site during the replication of the first snapshot;
- continuously applying the replicated high-frequency incremental snapshots to the staging file at the second site;
- pruning overwritten data in the replicated high-frequency incremental snapshots of the staging file at the second site to synthesize one or more full snapshots;
- pruning the one or more synthesized full snapshots of the staging file according to a snapshot retention policy; and
- merging the synthesized full snapshot of the staging file with the replicated first snapshot at the second site upon completion of the replication of the first snapshot.

8. The method of claim 7 further comprising synthesizing a second snapshot of the data object at the second site based on the continuously applied replicated incremental snapshots.

9. The method of claim 8 further comprising applying the snapshot retention policy to the second snapshot.

10. The method of claim 7 wherein the incremental snapshots occur at a periodic time interval.

11. The method of claim 7 wherein the incremental snapshots are based on write operations recorded in an operation log of the first site.

12. The method of claim 7, wherein the staging file is thinly provisioned.

13. An apparatus comprising:
- a network connecting a first node of a first site to a second node of a second site, the first node having a processor configured to execute program instructions configured to:
  - initiate replication of a first snapshot of a data object from the first site to the second site;
  - generate high-frequency incremental snapshots of the data object at intervals of less than or equal to 60 seconds at the first site having changes to the data object occurring after creation of the first snapshot;
  - replicate the incremental snapshots from the first site to a staging file at the second site during the replication of the first snapshot;
  - continuously apply the replicated high-frequency incremental snapshots to the staging file at second site;
  - prune overwritten data in the replicated incremental snapshots of the staging file at the second site to synthesize one or more full snapshots;
  - prune the one or more synthesized full snapshots of the staging file according to a snapshot retention policy; and
  - merge the synthesized full snapshot of the pruned staging file with the replicated first snapshot at the second site upon completion of the replication of the first snapshot.

14. The apparatus of claim 13 wherein the program instructions are further configured to synthesize a second snapshot of the data object at the second site based on the continuously applied replicated incremental snapshots.

15. The apparatus of claim 14 wherein the program instructions are further configured to apply the snapshot retention policy to the second snapshot.

16. The apparatus of claim 13 wherein the incremental snapshots occur at a periodic time interval.

17. The apparatus of claim 13 wherein the incremental snapshots are based on write operations recorded in an operation log of the first site.

18. The apparatus of claim 13, wherein the staging file is thinly provisioned.

19. A non-transitory computer readable medium including program instructions for execution on a processor, the program instructions configured to:
- initiate replication of a first snapshot of a data object from a first site to a second site;
- generate high-frequency incremental snapshots of the data object at intervals of less than or equal to 60 seconds at the first site having changes to the data object occurring after creation of the first snapshot;
- replicate the high-frequency incremental snapshots from the first site to a staging file at the second site in parallel with the replication of the first snapshot;
- continuously apply the replicated high-frequency incremental snapshots to the staging file at the second site;
- prune overwritten data in the replicated high-frequency incremental snapshots of the staging file at the second site to synthesize one or more full snapshots;
- prune the one or more synthesized full snapshots of the staging file according to a snapshot retention policy; and
- merge the pruned synthesized full snapshots of the staging file with the replicated first snapshot at the second site upon completion of the replication of the first snapshot.

* * * * *